US008879880B2

(12) United States Patent
Kim (10) Patent No.: US 8,879,880 B2
(45) Date of Patent: Nov. 4, 2014

(54) SURFACE PLASMON OPTICAL WAVEGUIDE (71) Applicant: Electronics and Telecommunications Research Institute, Daejeon (KR)

(72) Inventor: Min-Su Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/022,939

(22) Filed: Sep. 10, 2013

(65) Prior Publication Data

US 2014/0161405 A1 Jun. 12, 2014

(30) Foreign Application Priority Data

Dec. 11, 2012 (KR) ........................ 10-2012-0143711

(51) Int. Cl.
*G02B 6/10* (2006.01)
*G02B 6/036* (2006.01)
(52) U.S. Cl.
CPC ..................................... *G02B 6/036* (2013.01)
USPC .......................................... 385/131; 385/132
(58) Field of Classification Search
CPC ... G02B 5/008; G02B 6/1226; G02F 2203/10
USPC ............................................ 385/126, 131, 132
See application file for complete search history.

(56) References Cited

U.S. PATENT DOCUMENTS

| 7,184,641 B2 | 2/2007 | Karalis et al. | |
| 7,583,882 B2 | 9/2009 | Guo | |
| 2010/0150512 A1* | 6/2010 | Berini et al. | 385/130 |
| 2013/0128917 A1* | 5/2013 | Weeber et al. | 374/45 |

FOREIGN PATENT DOCUMENTS

KR 10-0953561 B1 4/2010

OTHER PUBLICATIONS

"Bound modes analysis of symmetric dielectric loaded surface plasmon-polariton waveguides" by Yun Binfeng et al, Optics Express, vol. 17, No. 5, pp. 3610-3618, 2009.*
"Design and Characterization of Dielectric-Loaded Plasmonic Directional Couplers" by Tobias Holmgaard et al, Journal of Lightwave Technology, vol. 27, No. 24, pp. 5521-5528, 2009.*
"Thermo-optic microring resonator switching elements made of dielectric-loaded plasmonic waveguides" by Tsilipakos et al, Journal of Applied Physics, vol. 109, pp. 073111-1 through 073111-9, Apr. 2011.*
"Silicon-based plasmonic waveguides" by Krasavin et al, Optics Express, vol. 18, No. 11, pp. 11791-11799, 2010.*
"Theoretical Analysis of Long-Range Dielectric-Loaded Surface Plasmon Polariton Waveguides" by Gosciniak et al, Journal of Lightwave Technology, vol. 29, No. 10, pp. 1473-1481, May 2011.*

* cited by examiner

*Primary Examiner* — Ryan Lepisto
*Assistant Examiner* — Robert Tavlykaev
(74) *Attorney, Agent, or Firm* — Rabin & Berdo, P.C.

(57) ABSTRACT

A surface plasmon optical waveguide includes a lower cladding, a metal thin layer on the lower cladding, low-k dielectric layers spaced apart from each other on one surface of the metal thin layer, and an upper cladding covering the low-k dielectric layers and the metal thin layer uncovered between the low-k dielectric layers. A refractive index of the low-k dielectric layers is less than a refractive index of the lower and upper claddings.

18 Claims, 6 Drawing Sheets

SURFACE PLASMON OPTICAL WAVEGUIDE

CROSS-REFERENCE TO RELATED APPLICATIONS

This U.S. non-provisional patent application claims priority under 35 U.S.C. §119 to Korean Patent Application No. 10-2012-0143711, filed on Dec. 11, 2012, the entirety of which is incorporated by reference herein.

BACKGROUND

The inventive concept relates to optical waveguides and, more particularly, to optical waveguides based on surface plasmons.

Surface plasmons are charge density oscillations confined at an interface between two materials of which dielectric constants have their respective real parts having signs opposite to each other. The surface plasmons may be easily formed at an interface between a metal having a dielectric constant with a negative real part and a dielectric having a dielectric constant with a positive real part. The surface plasmons may be excited by an electron beam or a light wave.

An electromagnetic wave combined with the surface plasmons is defined as surface plasmon polaritons (SPPs). Since a wave vector of the electromagnetic wave combined with the surface plasmons is greater than a wave vector of an electromagnetic wave in a surrounding medium, the SPPs are confined in a metal surface and then propagate along the metal surface. The SPPs have a transverse magnetic (TM) polarization with respect to the metal surface. An electromagnetic field intensity of the SPPs has the maximum value at the interface between the metal and the dielectric and is exponentially decayed as a distance from the interface of the metal and the dielectric increases. Thus, the interface of the metal and the dielectric may be used as a plane optical waveguide having a confinement condition along a direction perpendicular to the interface.

A SPP waveguide may generally have a very high propagation loss. Thus, it may be difficult to apply the SPP waveguide to a practical optical circuit with a length over several tens μm or hundreds μm. Meanwhile, if a thickness of a metal layer is equal to or less than a skin depth for an operating wavelength, SPPs guided by top and bottom surfaces of the metal may be combined with each other, such that a long-range SPP (LRSPP) mode with a very low propagation loss may be formed to transmit signals by a long distance of several mm to several tens cm. An electromagnetic field of the LRSPP mode may penetrate more strongly and widely into the dielectric around a metal thin layer than into the inside of the metal, such that the propagation loss of the light may be very low. Additionally, the LRSPPs may have excellent coupling characteristics with an optical fiber. Thus, the LRSPPs may be applied to various areas of optical devices.

SUMMARY

Embodiments of the inventive concept may provide optical waveguides capable of improving an integration degree of an optical circuit based on a LRSPP optical waveguide by improving a mode confinement effect of a LRSPP optical waveguide having low propagation loss.

In an aspect, a surface plasmon optical waveguide may include: a lower cladding; a metal thin layer on the lower cladding; low-k dielectric layers spaced apart from each other on a surface of the metal thin layer; and an upper cladding covering the low-k dielectric layers and the metal thin layer uncovered between the low-k dielectric layers. A refractive index of the low-k dielectric layers is less than a refractive index of the lower and upper claddings.

In an embodiment, a difference between the refractive index of the upper cladding and the refractive index of the low-k dielectric layers may be within a range of about 0.005 to about 0.2.

In an embodiment, a thickness of the low-k dielectric layers may be greater than a thickness of the metal thin layer.

In an embodiment, a distance between the low-k dielectric layers may be greater than a thickness of the low-k dielectric layers.

In an embodiment, a distance between the low-k dielectric layers may be about 10 to about 100 times greater than a thickness of the low-k dielectric layers.

In an embodiment, light may be guided in a LRSPP mode along a region where the upper cladding adjoins the metal thin layer uncovered between the low-k dielectric layers.

In an embodiment, the low-k dielectric layers may include first, second, and third low-k dielectric layers spaced apart from each other on a top surface of the metal thin layer; and a distance between the first and second low-k dielectric layers may be substantially equal to a distance between the second and third low-k dielectric layers.

In an embodiment, the low-k dielectric layers may include first, second, and third low-k dielectric layers spaced apart from each other on a top surface of the metal thin layer; and a distance between the first and second low-k dielectric layers may be different from a distance between the second and third low-k dielectric layers.

In an embodiment, the low-k dielectric layers may include upper low-k dielectric layers spaced apart from each other on a top surface of the metal thin layer and lower low-k dielectric layers spaced apart from each other on a bottom surface of the metal thin layer.

BRIEF DESCRIPTION OF THE DRAWINGS

The inventive concept will become more apparent in view of the attached drawings and accompanying detailed description.

DETAILED DESCRIPTION OF THE EMBODIMENTS

The inventive concept will now be described more fully hereinafter with reference to the accompanying drawings, in which exemplary embodiments of the inventive concept are shown. The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose the inventive concept and let those skilled in the art know the category of the inventive concept. In the drawings, embodiments of the inventive concept are not limited to the specific examples provided herein and are exaggerated for clarity.

The terminology used herein is for the purpose of describing particular embodiments only and is not intended to limit the invention. As used herein, the singular terms "a," "an" and "the" are intended to include the plural forms as well, unless the context clearly indicates otherwise. As used herein, the term "and/or" includes any and all combinations of one or more of the associated listed items.

Similarly, it will be understood that when an element such as a layer, region or structure is referred to as being "on" another element, it can be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concept explained and illustrated herein include their complementary counterparts. The same reference numerals or the same reference designators denote the same elements throughout the specification.

Moreover, exemplary embodiments are described herein with reference to cross-sectional illustrations and/or plane illustrations that are idealized exemplary illustrations. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etched region illustrated as a rectangle will, typically, have rounded or curved features. Thus, the regions illustrated in the figures are schematic in nature and their shapes are not intended to illustrate the actual shape of a region of a device and are not intended to limit the scope of example embodiments.

Figure 1:
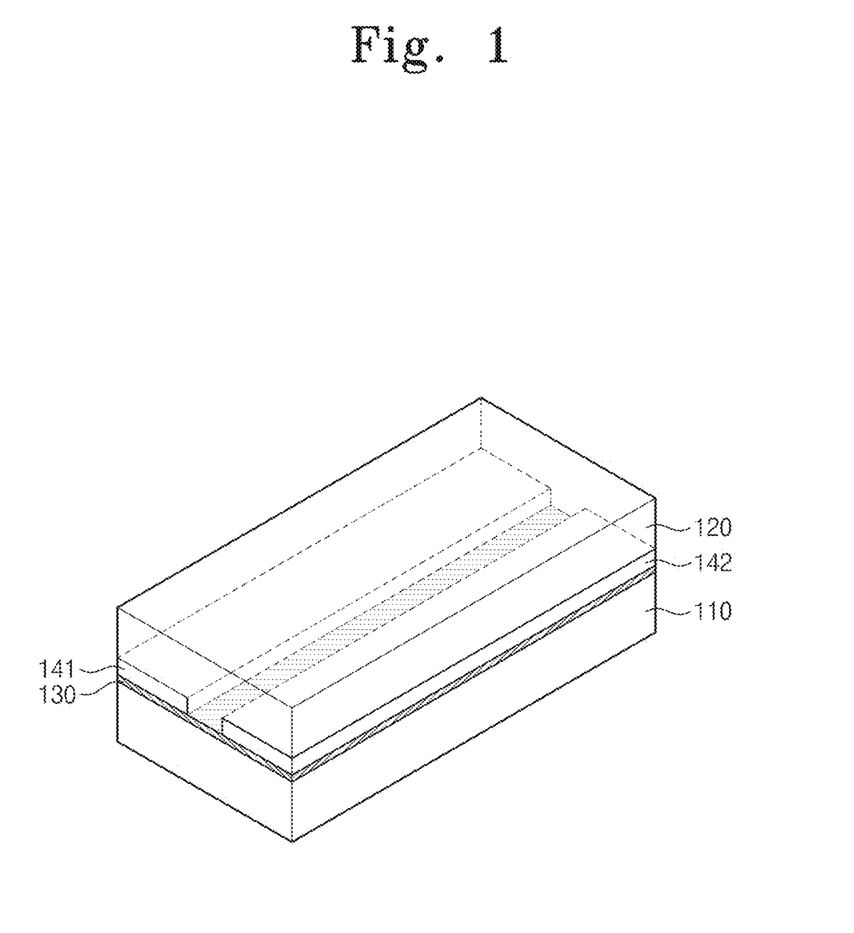
FIG. 1 is a perspective view illustrating an optical waveguide according to an embodiment of the inventive concept.
Figure 2:
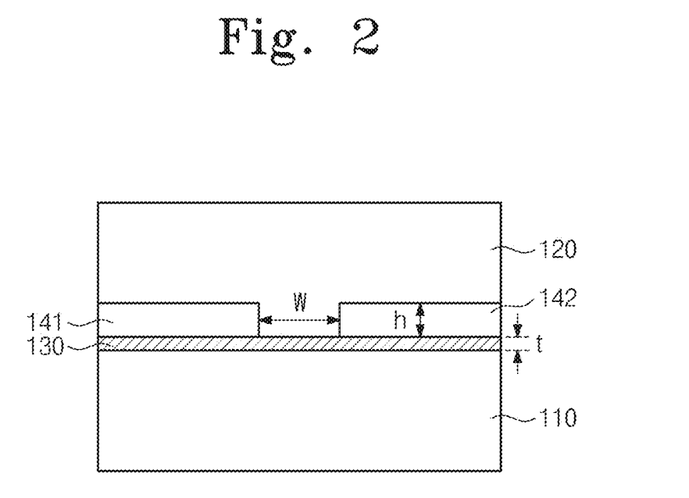
FIG. 2 is a cross-sectional view illustrating an optical waveguide according to an embodiment of the inventive concept.

FIG. 1 is a perspective view illustrating an optical waveguide according to an embodiment of the inventive concept. FIG. 2 is a cross-sectional view illustrating an optical waveguide according to an embodiment of the inventive concept.

Referring to FIGS. 1 and 2, a surface plasmon optical waveguide includes a lower cladding 110, an upper cladding 120, a metal thin layer 130, and low-k dielectric layers 141 and 142. The metal thin layer 130 and the low-k dielectric layer 141 and 142 may be disposed between the lower cladding 110 and the upper cladding 120. The lower-k dielectric layers 141 and 142 may be spaced apart from each other on a top surface of the metal thin layer 130

The lower cladding 110 and the upper cladding 120 may be formed of a dielectric material having a first refractive index. The lower cladding 110 and the upper cladding 120 may include an inorganic material such as silica, silicon, or a compound semiconductor. Alternatively, the lower cladding 110 and the upper cladding 120 may include an organic material (e.g., a polymer) or an organic and inorganic hybrid material. The lower cladding 110 and the upper cladding 120 may be formed of the same dielectric material or may be formed of dielectric materials different from each other. In the present embodiment, the upper cladding 120 may fill a space between the low-k dielectric layers 141 and 142. Additionally, the upper cladding 120 may be in contact with the metal thin layer 130 uncovered between the low-k dielectric layers 141 and 142 and may be in contact with top surfaces of the low-k dielectric layers 141 and 142.

The metal thin layer 130 may be formed of at least one of gold, silver, aluminum, copper, tungsten, doped silicon, a metal silicide, a conductive oxide, a graphene, and a crystalline alloy including a chalcogenide element.

The low-k dielectric layers 141 and 142 may be formed of a dielectric material having a second refractive index less than the first refractive index of the lower cladding 110 and the upper cladding 120. The low-k dielectric layers 141 and 142 spaced apart from each other may be formed of the same dielectric material or may be formed of dielectric materials different from each other. The low-k dielectric layers 141 and 142 may include an inorganic material such as silica, silicon, or a compound semiconductor. Alternatively, the low-k dielectric layers 141 and 142 may include an organic material (e.g., a polymer) or an organic and inorganic hybrid material. The low-k dielectric layers 141 and 142 may change an effective refractive index around the metal thin layer 130 in order to improve the optical confinement of a LRSPP mode.

According to embodiments of the inventive concept, a LRSPP mode in the surface plasmon optical waveguide may be formed by a refractive index distribution around the metal thin layer 130. In an embodiment, light incident on the surface plasmon optical waveguide may be guided in the LRSPP mode along a region where the upper cladding 120 adjoins the metal thin layer 130 uncovered between the low-k dielectric layers 141 and 142. The region where the upper cladding 120 adjoins the metal thin layer 130 uncovered between the low-k dielectric layers 141 and 142 may correspond to an effective core region of the surface plasmon optical waveguide in the present embodiment. Here, an electromagnetic wave in one of various wavelength bands may be used as the light according to materials constituting the optical waveguide and the purpose of the optical waveguide. In other words, the light may be a visible ray, a near-infrared ray, or a far-infrared ray. Additionally, propagation characteristics of the LRSPP mode may be varied according to the refractive index difference between the lower and upper claddings 110 and 120 and the low-k dielectric layers 141 and 142, a thickness t of the metal thin layer 130, a thickness h of the low-k dielectric layers 141 and 142, and a distance W between the low-k dielectric layers 141 and 142.

In more detail, if the refractive index difference between the lower and upper claddings 110 and 120 and the low-k dielectric layers 141 and 142 is small and the height h of the low-k dielectric layers 141 and 142 and the distance W between the low-k dielectric layers 141 and 142 are small, a lateral mode confinement effect may be weak in the effective core region such that a mode may spread around the whole structure of the metal thin layer 130. If the distance W between the low-k dielectric layers 141 and 142 is greater than the height h of the low-k dielectric layers 141 and 142, a confinement effect for the LRSPP mode in the effective core region may increase to reduce the mode size. Meanwhile, if the height h of the low-k dielectric layers 141 and 142 is much greater than a mode wavelength in the optical waveguide and the distance W between the low-k dielectric layers 141 and 142 is small, asymmetry of electric field distributions in an upper portion and a lower portion of the metal thin layer 130 may increase to generate a condition difficult to form the LRSPP mode. Thus, according to embodiments of the inventive concept, it is preferable that the height h of the low-k dielectric layers 141 and 142 may be similar to or less than the mode wavelength and the distance W between the low-k dielectric layers 141 and 142 may be similar to or greater than the mode wavelength. If the thickness t of the metal thin layer 130 is similar to or greater than the skin depth of the metal at the wavelength of the light, the mode confinement effect may increase but the propagation loss may also increase. Accordingly, it is preferable that the thickness t of the metal thin layer 130 is smaller than the skin depth.

In an embodiment, the refractive index difference between the lower and upper claddings 110 and 120 and the low-k dielectric layers 141 and 142 may be within a range of about 0.005 to about 0.2. For example, the refractive index of the lower and upper claddings 110 and 120 may be about 1.45, and the refractive index of the low-k dielectric layers 141 and 142 may be about 1.44.

In an embodiment, the thickness h of the low-k dielectric layers 141 and 142 may be greater than the thickness t of the metal thin layer 130. For example, the thickness t of the metal thin layer 130 may be within a range of about 5 nm to about 20 nm, and the thickness h of the low-k dielectric layers 141 and 142 may be within a range of about 0.1 μm to about 2.0 μm. Generally, if a thickness of a metal thin layer is lower than several tens nm, an nonuniformity of the thickness of the metal thin layer may greatly increase. If the metal thin layer has a thickness of about several nm, the metal thin layer may be formed as a discontinuous distribution of nano-size metal islands. Thus, the aforementioned thickness of the metal thin layer 130 may be an effective thickness corresponding or similar to the mean thickness of the nonuniform metal thin layer.

In an embodiment, the distance W between the low-k dielectric layers 141 and 142 may be greater than the thickness h of the low-k dielectric layers 141 and 142. The distance W between the low-k dielectric layers 141 and 142 may be about 10 to about 100 times greater than the thickness h of the low-k dielectric layers 141 and 142. For example, the distance W between the low-k dielectric layers 141 and 142 may be within a range of about 1 μm to about 20 μm.

The surface plasmon optical waveguide described above may reduce a mode size and hence improve the mode confinement effect. Additionally, the surface plasmon optical waveguide according to embodiments may provide a two-dimensional mode by only a patterning process for the low-k dielectric layers 141 and 142 without a patterning process for the metal thin layer 130. Thus, a manufacturing process of the optical waveguide may be simplified.

Figure 3A:
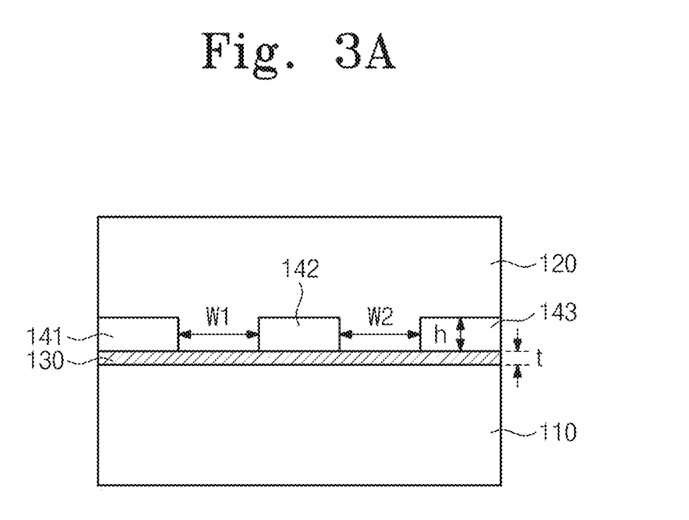
FIGS. 3A and 3B are cross-sectional views illustrating optical waveguides according to other embodiments of the inventive concept.
Figure 3B:
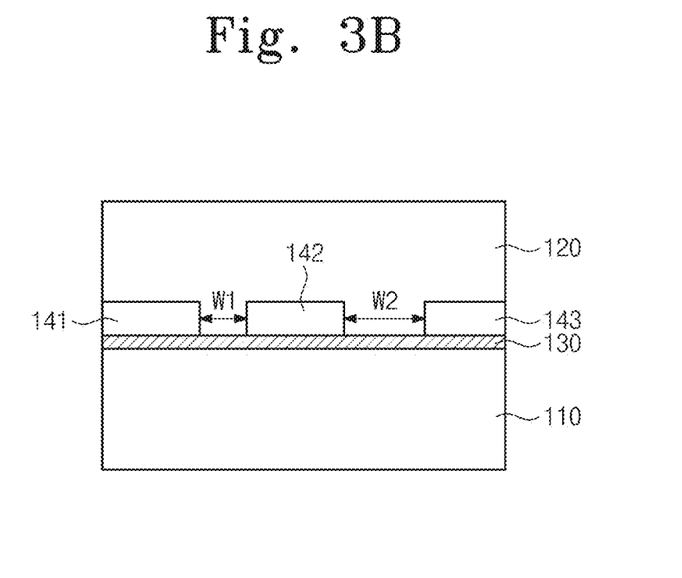

FIGS. 3A and 3B are cross-sectional views illustrating optical waveguides according to other embodiments of the inventive concept.

Referring to FIGS. 3A and 3B, a surface plasmon optical waveguide may include lower and upper claddings 110 and 120, a metal thin layer 130 disposed between the lower and upper claddings 110 and 120, and low-k dielectric layers 141, 142, and 143 disposed between the lower and upper claddings 110 and 120. In the present embodiment, the low-k dielectric layers include first, second, and third low-k dielectric layers 141, 142, and 143 laterally spaced apart from each other on the top surface of the metal thin layer 130.

The lower and upper claddings 110 and 120 may be formed of a dielectric material having a first refractive index. The lower and upper claddings 110 and 120 may include an inorganic material such as silica, silicon, or a compound semiconductor. Alternatively, the lower and upper claddings 110 and 120 may include an organic material (e.g., a polymer) or an organic and inorganic hybrid material. In the present embodiment, the upper cladding 120 may be in contact with the metal thin layer 130 uncovered between the first and second low-k dielectric layers 141 and 142 and between the second and third low-k dielectric layers 142 and 143.

The metal thin layer 130 may be formed of at least one of gold, silver, aluminum, copper, tungsten, doped silicon, a metal silicide, a conductive oxide, a graphene, and a crystalline alloy including a chalcogenide element.

The first to third low-k dielectric layers 141, 142, and 143 may be formed of a dielectric material having a second refractive index less than the first refractive index of the lower and upper claddings 110 and 120. The first to third low-k dielectric layers 141, 142, and 143 spaced apart from each other may be formed of the same dielectric material or may be formed of dielectric materials different from each other. The first to third low-k dielectric layers 141, 142, and 143 may include an inorganic material such as silica, silicon, or a compound semiconductor. Alternatively, the first to third low-k dielectric layers 141, 142, and 143 may include an organic material (e.g., a polymer) or an organic and inorganic hybrid material. The first to third low-k dielectric layers 141, 142, and 143 may change an effective refractive index around the metal thin layer 130 in order to improve the optical confinement of a LRSPP mode.

In the present embodiment, a thickness h of the first to third low-k dielectric layers 141, 142, and 143 may be greater than a thickness t of the metal thin layer 130. For example, the thickness t of the metal thin layer 130 may be within a range of about 5 nm to about 20 nm, and the thickness h of the low-k dielectric layers 141, 142, and 143 may be within a range of about 0.1 μm to about 2.0 μm.

In the present embodiment, a distance W1 between the first and second low-k dielectric layers 141 and 142 may be greater than the thickness h of the first to third low-k dielectric layers 141, 142, and 143. Additionally, a distance W2 between the second and third low-k dielectric layers 142 and 143 may be greater than the thickness h of the first to third low-k dielectric layers 141, 142, and 143. As illustrated in FIG. 3A, the distance W1 between the first and second low-k dielectric layers 141 and 142 may be substantially equal to the distance W2 between the second and third low-k dielectric layers 142 and 143. Alternatively, the distance W1 between the first and second low-k dielectric layers 141 and 142 may be different from the distance W2 between the second and third low-k dielectric layers 142 and 143, as illustrated in FIG. 3B.

In the present embodiment, light incident on the surface plasmon optical waveguide may be guided in a LRSPP mode along a first region where the upper cladding 120 adjoins the metal thin layer 130 uncovered between the first and second low-k dielectric layers 141 and 142 and along a second region where the upper cladding 120 adjoins the metal thin layer 130 uncovered between the second and third low-k dielectric layers 142 and 143.

Figure 4A:
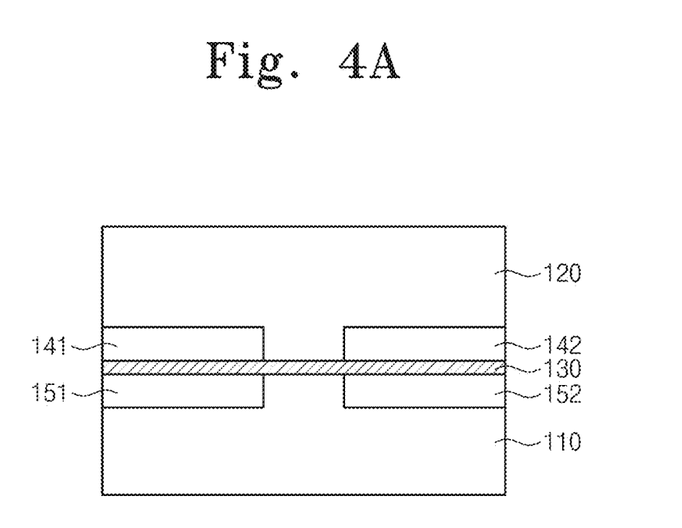
FIGS. 4A, 4B, and 4C are cross-sectional views illustrating optical waveguides according to still other embodiments of the inventive concept.
Figure 4B:
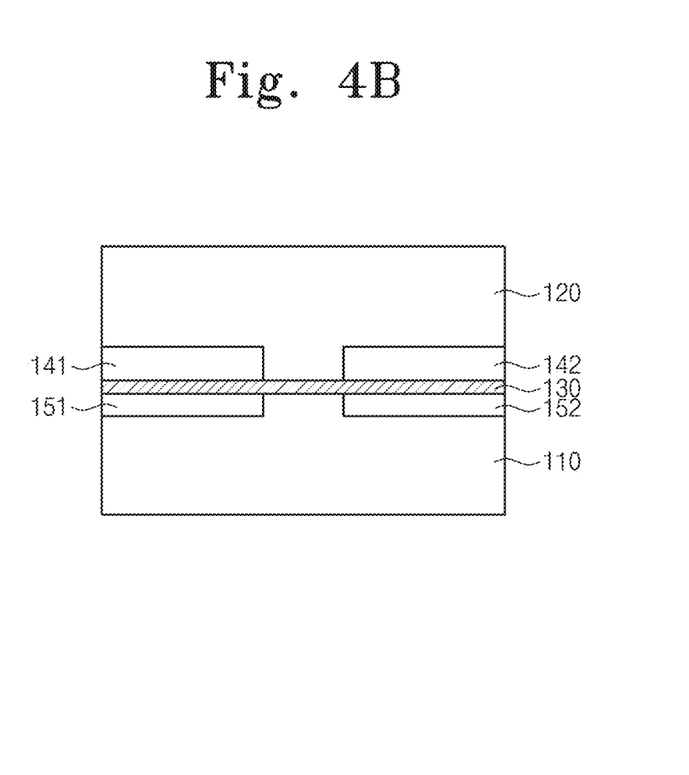
Figure 4C:
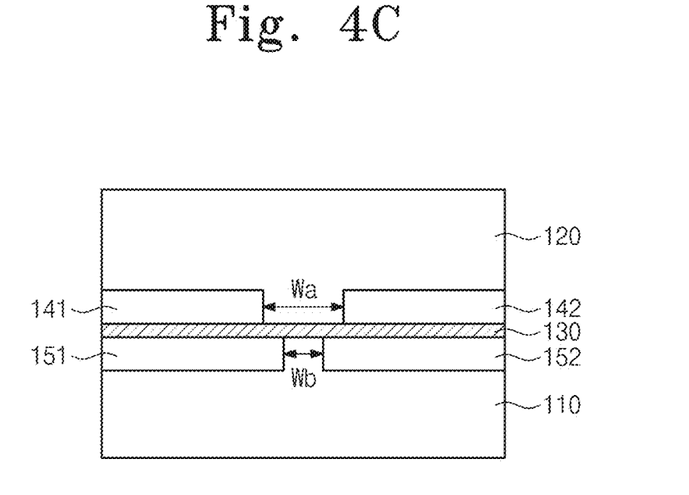

FIGS. 4A, 4B, and 4C are cross-sectional views illustrating optical waveguides according to still other embodiments of the inventive concept.

Referring to FIGS. 4A, 4B, and 4C, a surface plasmon optical waveguide may include lower and upper claddings 110 and 120, a metal thin layer 130 disposed between the lower and upper claddings 110 and 120, and low-k dielectric layers 141, 142, 151, and 152 disposed between the lower and upper claddings 110 and 120. In the present embodiment, the low-k dielectric layers include upper low-k dielectric layers 141 and 142 spaced apart from each other on a top surface of the metal thin layer 130 and lower low-k dielectric layers 151 and 152 spaced apart from each other on a bottom surface of the metal thin layer 130.

The lower and upper claddings 110 and 120 may be formed of a dielectric material having a first refractive index. The lower and upper claddings 110 and 120 may include an inorganic material such as silica, silicon, or a compound semiconductor. Alternatively, the lower and upper claddings 110 and 120 may include an organic material (e.g., a polymer) or an organic and inorganic hybrid material. In the present embodiment, the upper cladding 120 may be in contact with the top surface of the metal thin layer 130 between the upper low-k dielectric layers 141 and 142, and the lower cladding 110 may be in contact with the bottom surface of the metal thin layer 130 between the lower low-k dielectric layers 151 and 152.

The metal thin layer 130 may be formed of at least one of gold, silver, aluminum, copper, tungsten, doped silicon, a metal silicide, a conductive oxide, a graphene, and a crystalline alloy including a chalcogenide element.

The upper and lower low-k dielectric layers 141, 142, 151, and 152 may be formed of a dielectric material having a second refractive index less than the first refractive index of the lower and upper claddings 110 and 120. The upper and lower low-k dielectric layers 141, 142, 151, and 152 may be formed of the same dielectric material or may be formed of dielectric materials different from each other. The upper and lower low-k dielectric layers 141, 142, 151, and 152 may include an inorganic material such as silica, silicon, or a compound semiconductor. Alternatively, the upper and lower low-k dielectric layers 141, 142, 151, and 152 may include an organic material (e.g., a polymer) or an organic and inorganic hybrid material. The upper and lower low-k dielectric layers 141, 142, 151, and 152 may change an effective refractive index around the metal thin layer 130 in order to improve the optical confinement of a LRSPP mode.

Referring to FIGS. 4A to 4C, each of the upper and lower low-k dielectric layers 141, 142, 151, and 152 may be thicker than the metal thin layer 130. A distance between the upper low-k dielectric layers 141 and 142 may be greater than a thickness of the upper low-k dielectric layers 141 and 142, and a distance between the lower low-k dielectric layers 151 and 152 may be greater than a thickness of the lower low-k dielectric layers 151 and 152.

Referring to FIGS. 4A and 4C, the upper and lower low-k dielectric layers 141, 142, 151, and 152 may have the same thickness. Alternatively, as illustrated in FIG. 4B, the thickness of the upper low-k dielectric layers 141 and 142 may be different from the thickness of the lower low-k dielectric layers 151 and 152.

Referring to FIGS. 4A and 4B, the distance between the upper low-k dielectric layers 141 and 142 may be substantially equal to the distance between the lower low-k dielectric layers 151 and 152. Alternatively, as illustrated in FIG. 4C, a distance Wa between the upper low-k dielectric layers 141 and 142 may be different from a distance Wb between the lower low-k dielectric layers 151 and 152. In an embodiment, the distance Wa between the upper low-k dielectric layers 141 and 142 may be greater than the distance Wb between the lower low-k dielectric layers 151 and 152, as illustrated in FIG. 4C. Alternatively, the distance Wa between the upper low-k dielectric layers 141 and 142 may be less than the distance Wb between the lower low-k dielectric layers 151 and 152. In FIGS. 4A to 4C, a center of a space between the upper low-k dielectric layers 141 and 142 may be vertically aligned with a center of a space between the lower low-k dielectric layers 151 and 152. However, the inventive concept is not limited thereto. In another embodiment, the center of the space between the upper low-k dielectric layers 141 and 142 may be offset from the center of the space between the lower low-k dielectric layers 151 and 152.

Figure 5A:
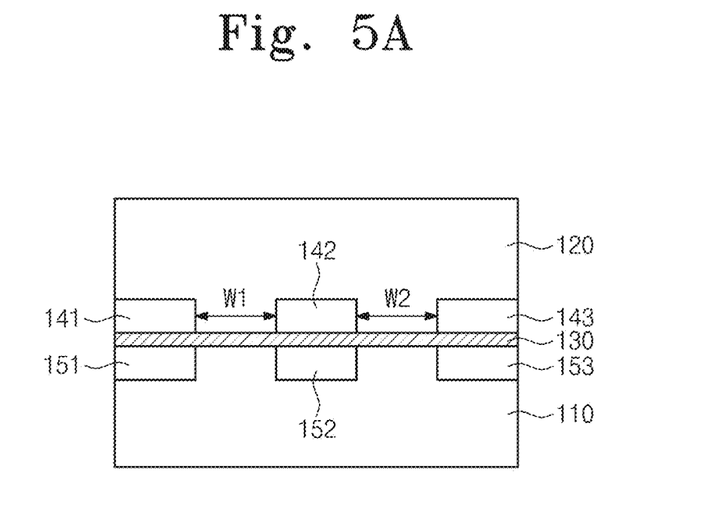
FIGS. 5A and 5B are cross-sectional views illustrating optical waveguides according to yet other embodiments of the inventive concept.
Figure 5B:
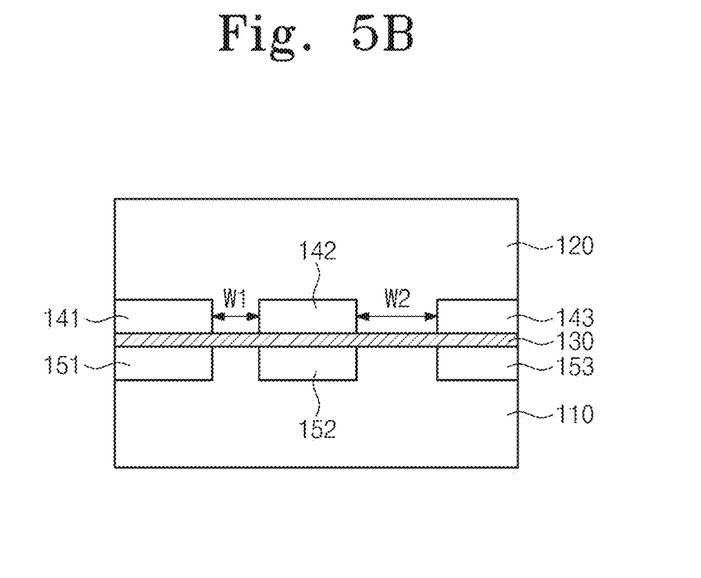

FIGS. 5A and 5B are cross-sectional views illustrating optical waveguides according to yet other embodiments of the inventive concept.

Referring to FIGS. 5A and 5B, a surface plasmon optical waveguide may include lower and upper claddings 110 and 120, a metal thin layer 130 disposed between the lower and upper claddings 110 and 120, and low-k dielectric layers 141, 142, 143, 151, 152, and 153 disposed between the lower and upper claddings 110 and 120. In the present embodiment, the low-k dielectric layers include first, second, and third upper low-k dielectric layers 141, 142, and 143 and first, second, and third lower low-k dielectric layers 151, 152, and 153. The first to third upper low-k dielectric layers 141, 142, and 143 may be spaced apart from each other on a top surface of the metal thin layer 130, and the first to third lower low-k dielectric layers 151, 152, and 153 may be spaced apart from each other on a bottom surface of the metal thin layer 130.

The lower and upper claddings 110 and 120 may be formed of a dielectric material having a first refractive index. The lower and upper claddings 110 and 120 may include an inorganic material such as silica, silicon, or a compound semiconductor. Alternatively, the lower and upper claddings 110 and 120 may include an organic material (e.g., a polymer) or an organic and inorganic hybrid material. In the present embodiment, the upper cladding 120 may be in contact with the top surface of the metal thin layer 130 between the first and second upper low-k dielectric layers 141 and 142 and between the second and third upper low-k dielectric layers 142 and 143. The lower cladding 110 may be in contact with the bottom surface of the metal thin layer 130 between the first and second lower low-k dielectric layers 151 and 152 and between the second and third lower low-k dielectric layers 152 and 153.

The metal thin layer 130 may be formed of at least one of gold, silver, aluminum, copper, tungsten, doped silicon, a metal silicide, a conductive oxide, a graphene, and a crystalline alloy including a chalcogenide element.

The upper and lower low-k dielectric layers 141, 142, 143, 151, 152, and 153 may be formed of a dielectric material having a second refractive index less than the first refractive index of the lower and upper claddings 110 and 120. The upper and lower low-k dielectric layers 141, 142, 143, 151, 152, and 153 may be formed of the same dielectric material or may be formed of dielectric materials different from each other, respectively. The upper and lower low-k dielectric layers 141, 142, 143, 151, 152, and 153 may include an inorganic material such as silica, silicon, or a compound semiconductor. Alternatively, the upper and lower low-k dielectric layers 141, 142, 143, 151, 152, and 153 may include an organic material (e.g., a polymer) or an organic and inorganic hybrid material.

In the present embodiment, thicknesses of the first to third upper low-k dielectric layers 141, 142, and 143 and the first to third lower low-k dielectric layers 151, 152, and 153 may be greater than a thickness of the metal thin layer 130. For example, the thickness of the metal thin layer 130 may be within a range of about 5 nm to about 20 nm, and the thicknesses of the upper and lower low-k dielectric layers 141, 142, 143, 151, 152, and 153 may be within a range of about 0.1 μm to about 2.0 μm.

In the present embodiment, the thickness of the first to third upper low-k dielectric layers 141, 142, and 143 may be substantially equal to the thickness of the first to third lower low-k dielectric layers 151, 152, and 153. Alternatively, the thickness of the first to third upper low-k dielectric layers 141, 142, and 143 may be different from the thickness of the first to third lower low-k dielectric layers 151, 152, and 153.

In the present embodiment, a distance W1 between the first and second upper low-k dielectric layers 141 and 142 may be greater than the thickness of the first to third upper low-k dielectric layers 141, 142, and 143. Additionally, a distance W2 between the second and third upper low-k dielectric layers 142 and 143 may be greater than the thickness of the first to third upper low-k dielectric layers 141, 142, and 143. Likewise, a distance between the first and second lower low-k dielectric layers 151 and 152 may be greater than the thickness of the first to third lower low-k dielectric layers 151, 152, and 153, and a distance between the second and third lower low-k dielectric layers 152 and 153 may also be greater than the thickness of the first to third lower low-k dielectric layers 151, 152, and 153.

As illustrated in FIG. 5A, the distance W1 between the first and second upper low-k dielectric layers 141 and 142 may be substantially equal to the distance W2 between the second and third upper low-k dielectric layers 142 and 143. Alternatively, the distance W1 between the first and second upper low-k dielectric layers 141 and 142 may be different from the distance W2 between the second and third upper low-k dielectric layers 142 and 143, as illustrated in FIG. 5B.

Figure 6:
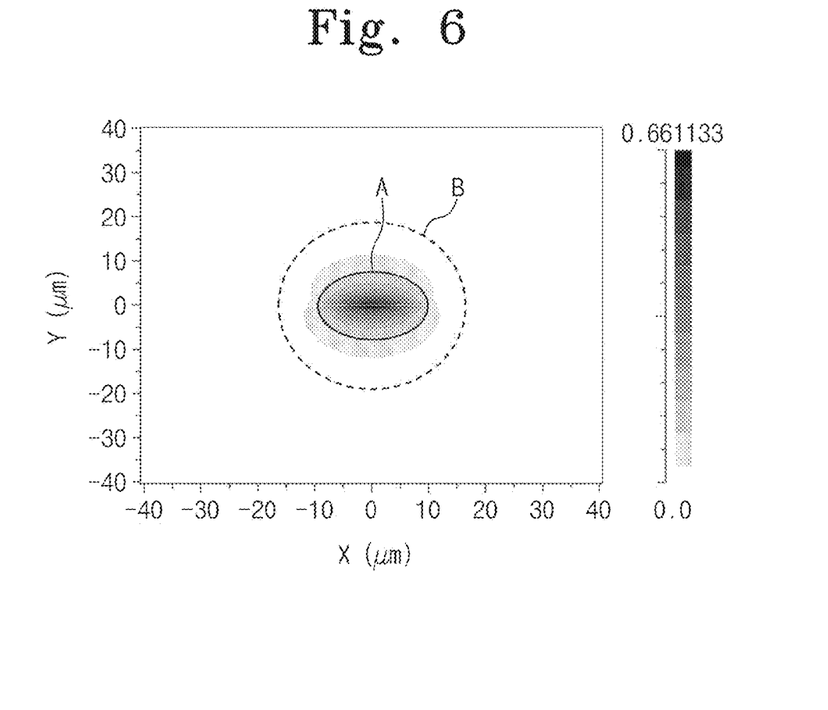
FIGS. 6 and 7 are graphs illustrating field intensity distributions calculated under different conditions of an optical waveguide according to an embodiment of the inventive concept.
Figure 7:
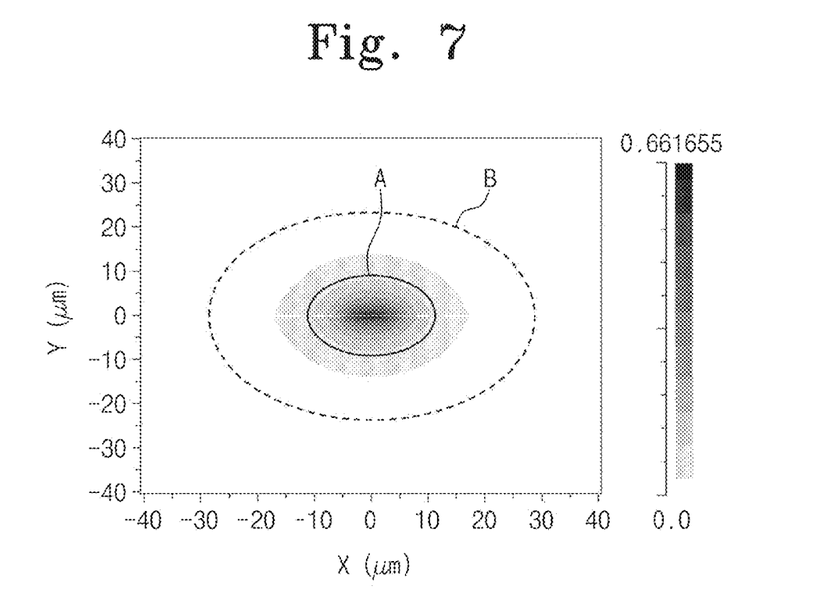

FIGS. 6 and 7 are graphs illustrating field intensity distributions for LRSPP modes calculated at a wavelength of 1.55 μm under different conditions of an optical waveguide according to an embodiment of the inventive concept.

For calculating the field intensity distributions, it is assumed that the low-k dielectric layers are formed of a dielectric material having a refractive index of 1.44, the lower and upper claddings are formed of a dielectric material having a refractive index of 1.45, and the metal thin layer is formed of silver. FIG. 6 illustrates field intensity distribution of a LRSPP mode in the optical waveguide illustrated in FIG. 2 which includes the metal thin layer 130 having the thickness of 8 nm and the low-k dielectric layers 141 and 142 having the height of 2 μm and the distance of 20 μm therebetween. FIG. 7 illustrates field intensity distribution of a LRSPP mode in the optical waveguide illustrated in FIG. 2 which includes the metal thin layer 130 having the thickness of 8 nm and the low-k dielectric layers 141 and 142 having the height of 0.5 μm and the distance of 10 μm therebetween.

According to the result of the mode calculation, a propagation loss of the LRSPP mode in FIG. 6 is about 0.7 dB/cm, and a propagation loss of the LRSPP mode in FIG. 7 is about 0.6 dB/cm. The propagation losses for FIGS. 6 and 7 are similar to each other in spite of the differences in the height and the distance of the low-k dielectric layers. The optical waveguides for FIGS. 6 and 7 have very low propagation losses less than 1 dB/cm such that they are easily applied to practical optical circuits.

Each of regions A in FIGS. 6 and 7 corresponds to an area where an electromagnetic power density is equal to or greater than a value obtained by multiplying 1/e2 by a maximum electromagnetic power density. The region A of FIG. 6 has a size equal to about 70% of a size of the region A of FIG. 7. Each of regions B in FIGS. 6 and 7 corresponds to an area where the electromagnetic power density is equal to or greater than 1% of the maximum electromagnetic power density. The region B of FIG. 6 has a size less than about 50% of a size of the region B of FIG. 7.

As a result, the height and the distance of the low-k dielectric layers may be controlled to reduce the mode size and hence to improve the mode confinement of the LRSPP mode in the effective core region without an increase in the propagation loss. Improving the mode confinement means that an electromagnetic field of a mode is more concentrated to a core region such that a mode size is more reduced. The mode size is reduced to realize a more highly integrated optical circuit.

According to embodiments of the inventive concept, the low propagation loss of the LRSPP mode may be maintained while the mode confinement effect of the LRSPP mode may be improved. Additionally, the optical waveguide may be manufactured without the patterning process of the metal thin layer. Thus, the manufacturing process of the optical waveguide may be simplified.

While the inventive concept has been described with reference to example embodiments, it will be apparent to those skilled in the art that various changes and modifications may be made without departing from the spirit and scope of the inventive concept. Therefore, it should be understood that the above embodiments are not limiting, but illustrative. Thus, the scope of the inventive concept is to be determined by the broadest permissible interpretation of the following claims and their equivalents, and shall not be restricted or limited by the foregoing description.

What is claimed is:

1. A surface plasmon optical waveguide comprising:
    a lower cladding;
    a metal thin layer on the lower cladding;
    low-k dielectric layers spaced apart from each other on a surface of the metal thin layer; and
    an upper cladding covering the low-k dielectric layers and the metal thin layer uncovered between the low-k dielectric layers,
    wherein a refractive index of the low-k dielectric layers is less than a refractive index of the lower and upper claddings.

2. The surface plasmon optical waveguide of claim 1, wherein a difference between the refractive index of the upper cladding and the refractive index of the low-k dielectric layers is within a range of about 0.005 to about 0.2.

3. The surface plasmon optical waveguide of claim 1, wherein a thickness of the low-k dielectric layers is greater than a thickness of the metal thin layer.

4. The surface plasmon optical waveguide of claim 1, wherein a distance between the low-k dielectric layers is greater than a thickness of the low-k dielectric layers.

5. The surface plasmon optical waveguide of claim 1, wherein a distance between the low-k dielectric layers is about 10 to about 100 times greater than a thickness of the low-k dielectric layers.

6. The surface plasmon optical waveguide of claim 1, wherein a thickness of the metal thin layer is within a range of about 5 nm to about 20 nm.

7. The surface plasmon optical waveguide of claim 1, wherein a thickness of the low-k dielectric layers is within a range of about 0.1 μm to about 2.0 μm.

8. The surface plasmon optical waveguide of claim 1, wherein a distance between the low-k dielectric layers is within a range of about 1 μm to about 20 μm.

9. The surface plasmon optical waveguide of claim 1, wherein light is guided in a long-range surface plasmon polariton (LRSPP) mode along a region where the upper cladding adjoins the metal thin layer uncovered between the low-k dielectric layers.

10. The surface plasmon optical waveguide of claim 1, wherein the low-k dielectric layers include first, second, and third low-k dielectric layers spaced apart from each other on a top surface of the metal thin layer; and
    a distance between the first and second low-k dielectric layers is substantially equal to a distance between the second and third low-k dielectric layers.

11. The surface plasmon optical waveguide of claim 10, wherein the distance between the first and second low-k dielectric layers is greater than a thickness of the first to third low-k dielectric layers.

12. The surface plasmon optical waveguide of claim 10, wherein light is guided in a LRSPP mode along a first region where the upper cladding adjoins the metal thin layer uncovered between the first and second low-k dielectric layers and along a second region where the upper cladding adjoins the metal thin layer uncovered between the second and third low-k dielectric layers.

13. The surface plasmon optical waveguide of claim 1, wherein the low-k dielectric layers include first, second, and third low-k dielectric layers spaced apart from each other on a top surface of the metal thin layer; and
    a distance between the first and second low-k dielectric layers is different from a distance between the second and third low-k dielectric layers.

14. The surface plasmon optical waveguide of claim 13, wherein the distance between the first and second low-k dielectric layers is greater than a thickness of the first to third low-k dielectric layers; and
    the distance between the second and third low-k dielectric layers is also greater than the thickness of the first to third low-k dielectric layers.

15. The surface plasmon optical waveguide of claim 1, wherein the low-k dielectric layers include upper low-k dielectric layers spaced apart from each other on a top surface of the metal thin layer and lower low-k dielectric layers spaced apart from each other on a bottom surface of the metal thin layer.

16. The surface plasmon optical waveguide of claim 15, wherein a distance between the upper low-k dielectric layers is substantially equal to a distance between the lower low-k dielectric layers.

17. The surface plasmon optical waveguide of claim 15, wherein a distance between the upper low-k dielectric layers is different from a distance between the lower low-k dielectric layers.

18. The surface plasmon optical waveguide of claim 15, wherein a distance between the upper low-k dielectric layers is greater than a thickness of the upper low-k dielectric layers; and
    a distance between the lower low-k dielectric layers is greater than a thickness of the lower low-k dielectric layers.

* * * * *